(12) United States Patent
Itagaki et al.

(10) Patent No.: US 10,129,730 B2
(45) Date of Patent: Nov. 13, 2018

(54) WIRELESS TERMINAL, SEARCH PROCESS METHOD FOR WIRELESS TERMINAL, AND WIRELESS COMMUNICATION SYSTEM

(71) Applicant: SONY CORPORATION, Tokyo (JP)

(72) Inventors: Takeshi Itagaki, Tokyo (JP); Katsutoshi Itoh, Tokyo (JP); Eisuke Sakai, Tokyo (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/912,029

(22) PCT Filed: Jul. 11, 2014

(86) PCT No.: PCT/JP2014/068645
§ 371 (c)(1),
(2) Date: Feb. 12, 2016

(87) PCT Pub. No.: WO2015/022828
PCT Pub. Date: Feb. 19, 2015

(65) Prior Publication Data
US 2016/0198331 A1    Jul. 7, 2016

(30) Foreign Application Priority Data
Aug. 12, 2013   (JP) .................................. 2013-167304

(51) Int. Cl.
*H04W 4/00*     (2018.01)
*H04W 8/00*     (2009.01)
*H04W 48/16*    (2009.01)

(52) U.S. Cl.
CPC ........... *H04W 8/005* (2013.01); *H04W 48/16* (2013.01)

(58) Field of Classification Search
None
See application file for complete search history.

(56) References Cited

U.S. PATENT DOCUMENTS

2002/0176366 A1* 11/2002 Ayyagari .............. H04M 3/304
                                                       370/244
2003/0119522 A1*  6/2003 Barclay ................... H04W 4/02
                                                      455/456.1
(Continued)

FOREIGN PATENT DOCUMENTS

JP    2008-048304 A    2/2008
JP    2009-111776 A    5/2009
(Continued)

*Primary Examiner* — Moustapha Diaby
(74) *Attorney, Agent, or Firm* — Chip Law Group

(57) ABSTRACT

It is possible to rapidly discover a wireless terminal as a connection partner without preliminarily sharing information related to a scan.
A search parameter for searching for a search target wireless terminal is determined depending on preliminarily set correspondence relation from given information. The search processing is performed based on the search parameter to discover the search target wireless terminal. For example, the given information is position information of the wireless terminal, information unique to the search target wireless terminal, and the like. Moreover, the search parameter is a wireless system, a wireless channel, a network identifier, search execution timing, and the like.

11 Claims, 11 Drawing Sheets

(56) References Cited

U.S. PATENT DOCUMENTS

| | | | | |
|---|---|---|---|---|
| 2009/0010231 | A1* | 1/2009 | Laroia | H04W 56/001 370/338 |
| 2009/0323659 | A1* | 12/2009 | Zhang | H04W 76/023 370/338 |
| 2012/0270514 | A1* | 10/2012 | Zhang | H04H 60/51 455/154.1 |
| 2012/0306909 | A1* | 12/2012 | Mochizuki | G06F 3/0481 345/619 |
| 2013/0007231 | A1* | 1/2013 | Forssell | H04L 41/082 709/221 |
| 2013/0072170 | A1* | 3/2013 | Hong | H04L 67/16 455/414.1 |
| 2013/0262686 | A1* | 10/2013 | Hill | H04L 65/1069 709/228 |
| 2014/0064198 | A1* | 3/2014 | Pan | H04W 76/02 370/329 |
| 2015/0350943 | A1* | 12/2015 | Wirola | H04W 64/00 370/252 |

FOREIGN PATENT DOCUMENTS

| | | |
|---|---|---|
| JP | 2009-141794 A | 6/2009 |
| JP | 2010-136290 A | 6/2010 |
| JP | 2012-119768 A | 6/2012 |

\* cited by examiner

WIRELESS TERMINAL, SEARCH PROCESS METHOD FOR WIRELESS TERMINAL, AND WIRELESS COMMUNICATION SYSTEM

TECHNICAL FIELD

The present technology relates to a wireless terminal, a search process method for a wireless terminal, and a wireless communication system. Particularly, the present technology relates to a wireless terminal first searching for a surrounding wireless terminal for connection, and the like.

BACKGROUND ART

In a wireless system (wireless communication system) having a plurality of operation channel candidates, the first procedure for connection is searching for a surrounding wireless terminal. When the search is performed without recognizing the mutual existence, each wireless terminal sequentially switches wireless channels, and further switches the functions of an active search side (or an announce side) and a waiting side temporally, as a normal searching procedure.

Such procedure secures mutual discovery at any point of time. However, unless a wireless channel (social channel for a search in the case of Wi-Fi Direct, for example) is provided at the same time between wireless terminals, the discovery is not possible in general. Thus, it may take long time to discover each other, depending on timing.

There have existed problems of deterioration of user operability and increase of power consumption due to prolongation of time for discovery. Moreover, when a plurality of candidates for a wireless system exist and they cannot be used at the same time, the combination is further increased, which prolongs time for discovery.

Conventionally, there is proposed a method of securing discovery by only searching for one wireless channel using one wireless channel preliminarily shared between terminals by any method. Note that in this case, there is no need to necessarily distinguish an active search state (or an announce state) and a waiting state because it is guaranteed that the wireless channel is provided and not shifted.

For example, Patent Literature 1 discloses the technology in which a wireless terminal having two wireless interfaces for wide-range wireless communication and narrow-range wireless communication preliminarily notifies, prior to neighborhood search in narrow-range wireless, a search target terminal of scan information such as a wireless channel, a search interval, and search start time to share it using wide-range wireless via a base station, so as to make a scan more efficient.

Moreover, Patent Literature 2, for example, discloses the technology in which a base station generates control information related to a search (channel, network ID, scan parameter, timing synchronization information) and notifies each terminal of the control information so as to make a scan more efficient.

CITATION LIST

Patent Literature

Patent Literature 1: JP 2009-111776A
Patent Literature 2: JP 2008-048304A

SUMMARY OF INVENTION

Technical Problem

When a surrounding wireless terminal is discovered by only searching for one wireless channel shared between terminals, it is necessary that the connection in another wireless system is preliminarily established among the terminals (or terminals via a base station), for example, so as to preliminarily share information related to a scan. Thus, when another wireless system is outside a range, it cannot be used.

The object of the present technology is enabling the rapid discovery of a wireless terminal as a connection partner without preliminarily sharing information related to a scan.

Solution to Problem

The concept of the present technology resides in a wireless terminal including: a search parameter determination unit configured to determine a search parameter for searching for a search target wireless terminal based on preliminarily set correspondence relation from given information; and a search processing unit configured to perform search processing based on the determined search parameter and to discover the search target wireless terminal.

According to the present technology, a search parameter for searching for a search target wireless terminal is determined by the search parameter determination unit based on preliminarily set correspondence relation from given information. For example, the given information may be position information of the wireless terminal.

In this case, the search parameter determination unit may cluster and use the position information in given granularity. With this clustering, it is possible to absorb an error of position information and determine the same search parameter for wireless terminals in a certain range.

In this case, the search parameter determination unit may use, as the given granularity, granularity in accordance with a wireless system (wireless communication system) used for a search. Moreover, a propagation distance differs depending on a wireless system used for a search. Thus, the granularity of clustering can be set into a range reached by radio waves using the granularity in accordance with a wireless system.

For example, the given information may be information unique to a search target wireless terminal. In this case, the information unique to a search target wireless terminal may include at least one of a terminal identification ID, and a common ID depending on an application. In this case, the terminal identification ID may include at least one of a MAC address or an IMEI of a terminal and an IMSI or an MSISDN of a terminal contract.

In this case, the common ID depending on an application may include at least one of an application name, information specifying a past session between terminals, information specifying a belonging group, information specifying a community, information specifying an event being held, information specifying an area in which a terminal exists, and information specifying a user's preference. In this case, the common ID depending on an application may be a multicast IP address.

The search processing unit performs search processing based on the determined search parameter and discovers a search target wireless terminal. For example, the search parameter may include at least one of a wireless system, a wireless channel, a network identifier, and search execution timing.

In this manner, in the present technology, search processing is performed based on a search parameter for searching for a search target wireless terminal that is determined based on preliminarily set correspondence relation from given information, so as to discover a search target wireless terminal. Thus, it is possible to rapidly discover a wireless terminal as a connection partner without preliminarily sharing information related to a scan.

According to the present technology, for example, when connection in another wireless system does not exist between the wireless terminal and the search target wireless terminal, the search parameter determination unit may determine the search parameter based on the given information. The search processing unit may perform search processing based on the determined search parameter and discover the search target wireless terminal.

According to the present technology, for example, the search parameter determination unit may determine a wireless channel as the search parameter. The search processing unit may perform search processing by fallback to a scan in all channels when the search target wireless terminal is not discovered by search processing based on the determined wireless channel.

According to the present technology, for example, the search parameter determination unit may determine a wireless channel as the search parameter. The search processing unit may discover the search target wireless terminal by search processing based on the determined wireless channel. The wireless terminal may further include a wireless channel change unit configured to change, after the wireless terminal is connected to the discovered search target wireless terminal in the wireless channel serving as the search parameter, the wireless channel to a more appropriate wireless channel. Thus, it is possible to perform actual communication in a wireless channel with small interference, for example.

Advantageous Effects of Invention

According the present technology, it is possible to rapidly discover a wireless terminal as a connection partner without preliminarily sharing information related to a scan. Note that the effects described herein are not limited, and any effects described in the present disclosure may be exerted.

DESCRIPTION OF EMBODIMENTS

Figure 1:
FIG. 1 is a block diagram illustrating a configuration example of a wireless communication system.

Hereinafter, forms for implementing the invention (hereinafter, referred to as embodiments) will be described. The description will be given in the following order.
1. Embodiments
2. Modification 1. Embodiments Configuration Example of Communication System FIG. 1 illustrates a configuration example of a wireless communication system 10 as an embodiment. The wireless communication system 10 includes a plurality of wireless terminals, two wireless terminals 101, 102 here. These wireless terminals do not recognize the mutual existence and it is unknown whether radio waves can reach. In such a kind of wireless communication system 10, a surrounding wireless terminal is searched first for the connection of wireless terminals.

Figure 2:
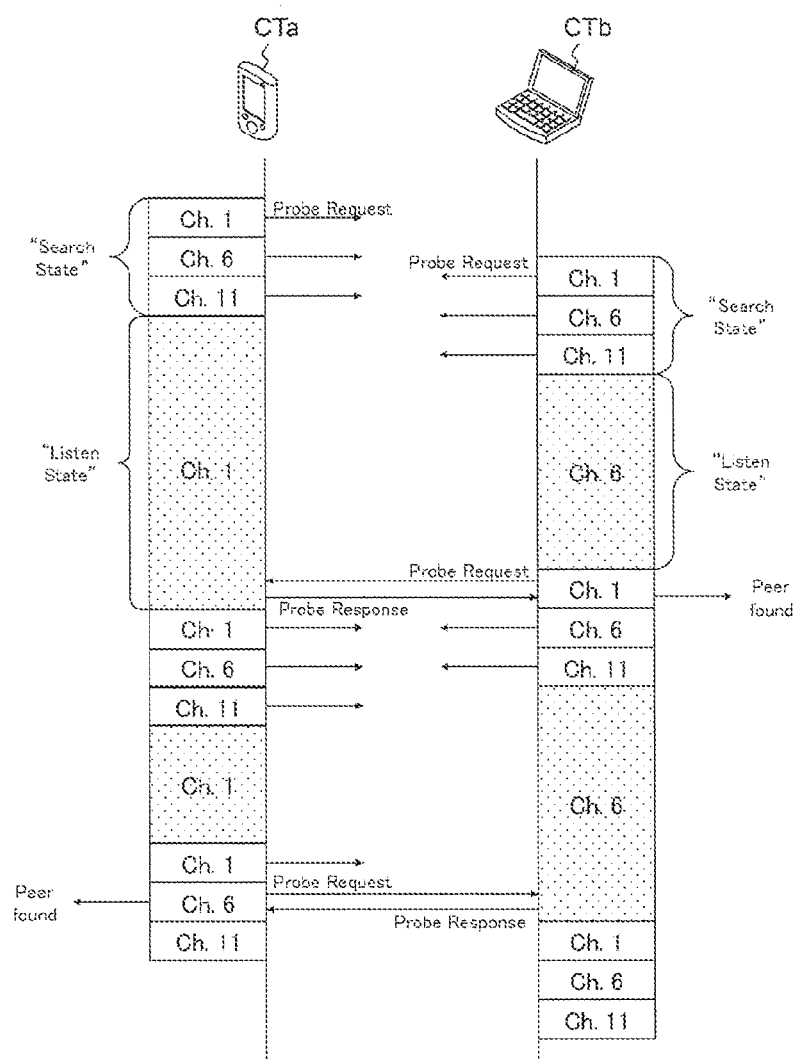
FIG. 2 is a diagram for explaining a general example of a searching procedure performed first for the connection of wireless terminals.

FIG. 2 illustrates a general example of a searching procedure. This example illustrates a searching procedure defined in Wi-Fi Direct in a wireless LAN.

Each of wireless terminals CTa, CTb switches the functions as a search side and a waiting side temporally. Each of communication terminals CTa, CTb in the search state sequentially changes a wireless channel to "CH. 1", "CH. 6", and "CH. 11", and transmits a probe request. Moreover, each of the communication terminals CTa, CTb sequentially switches wireless channels in the waiting state.

When one wireless terminal is in the waiting state in a certain wireless channel and the other wireless terminal transmits a probe request in such a wireless channel, the one wireless terminal receives the probe request. Then, the one wireless terminal immediately transmits a probe response to the other wireless terminal in the wireless channel. In this manner, the wireless terminals CTa, CTb discover wireless terminals to be connected each other.

In such a general searching procedure example, the discovery is not possible unless a wireless channel is provided at the same time between wireless terminals. Thus, it may take long time to discover each other.

Figure 3:
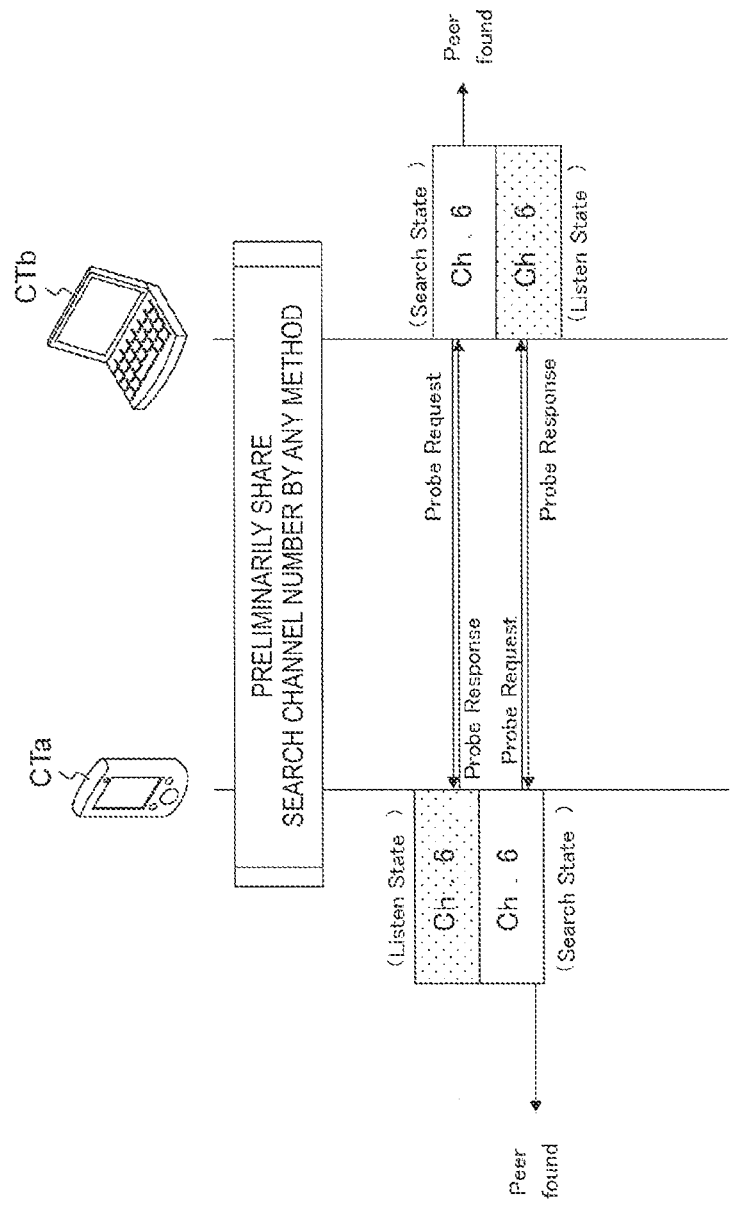
FIG. 3 is a diagram for explaining another example of the searching procedure performed first for the connection of wireless terminals.

FIG. 3 illustrates another example of searching procedure. This example is an example in which the wireless terminals CTa, CTb preliminarily share a search channel by any method. Each of the wireless terminals CTa, CTb performs single channel scan processing. The illustrated example is an example of the case when "CH. 6" is shared as a search channel.

In this case, when one wireless terminal transmits a probe request, the other wireless terminal always receives it. Then, the other wireless terminal transmits a probe response to the one wireless terminal. In this manner, the wireless terminals CTa, CTb discover wireless terminals to be connected each other.

In this another example of searching procedure, the search channel is shared, which can reduce time for mutual discovery. However, it is necessary to preliminarily share a search channel by any method. For example, the connection by different wireless is necessary.

In this embodiment, the wireless terminals 101, 102 perform a searching procedure different from the searching procedures illustrated in the above-described FIG. 2 and FIG. 3 for connection so as to discover wireless terminals to be connected.

Figure 4:
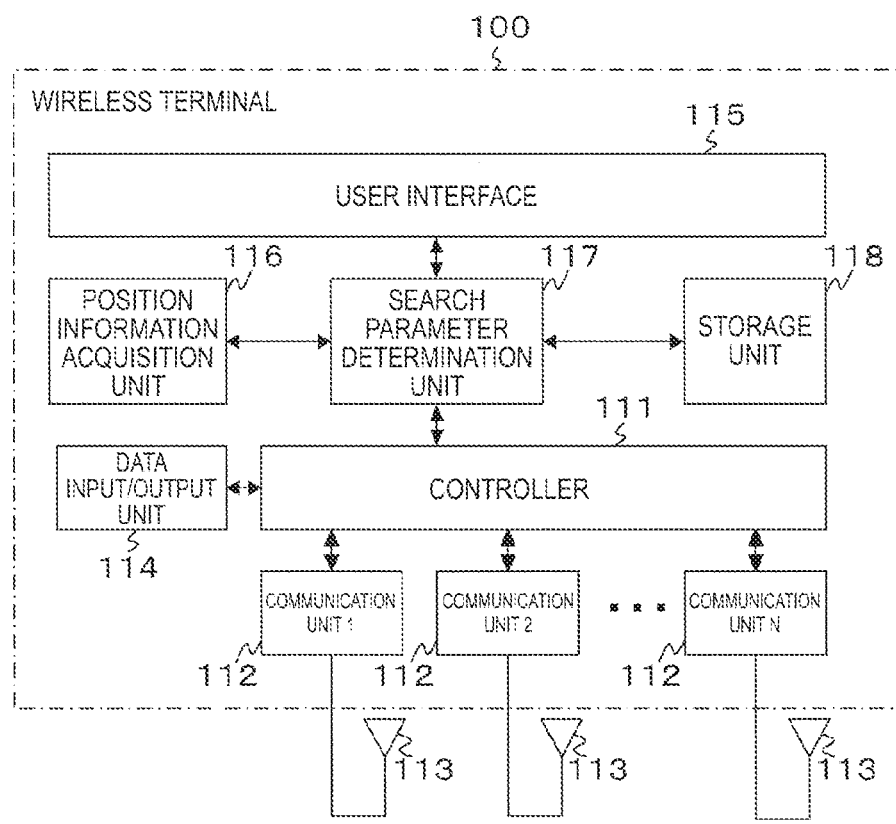
FIG. 4 is a block diagram illustrating a configuration example of a wireless terminal.

FIG. 4 illustrates a configuration example of the wireless terminal 100 (wireless terminals 101, 102). The wireless terminal 100 includes a controller 111, N-pieces communication units 112, N-pieces of antennas 113, a data input/output unit 114, a user interface 115, a position information acquisition unit 116, a search parameter determination unit 117, and a storage unit 118. When the wireless terminal 100 supports a plurality of wireless systems, N that is the number of the communication units 112 is plural.

The controller 111 controls operation of each unit of the wireless terminal 100. The controller 111 selects the communication unit 112 to be used, sets a parameter for a search, and performs connection processing at the time of discovery of a device, for example. The controller 111 also distributes data provided from an upper layer application to the communication units 112.

In accordance with each wireless system (wireless communication system), the communication unit 112 adds a header and an error detection code and performs modulation processing, for example, in transmission, while it performs demodulation processing, analysis of header information, reorder processing, and the like, in reception. The storage unit 118 retains various kinds of application data including account information of the terminal including the storage unit 118.

The position information acquisition unit 116 acquires, using means such as a global positioning system (GPS), position information (latitude/longitude information) of a current position of the terminal including the position information acquisition unit 116. The search parameter determination unit 117 determines a search parameter for searching for a search target wireless terminal using various kinds of information in the storage unit 118, input information from the user interface 115, input of position information from the position information acquisition unit 116, and the like. That is, the search parameter determination unit 117 determines a search parameter based on preliminarily set correspondence relation from given information.

The search parameter includes at least one of a wireless system, a wireless channel, a network identifier, and search execution timing. The search parameter derivation rule is determined uniquely depending on input various kinds of information, and the same rule is shared between terminals.

Note that the flow of data communication itself after the connection is established is not related directly to the present technology. In the following, neighborhood search processing will be described with a plurality of examples, including the use of the search parameter determination unit 117, the storage unit 118, and the position information acquisition unit 116.

Example 1

In the wireless communication system 10 illustrated in FIG. 1, each of the wireless terminals 101, 102 has not recognized the mutual existence, and it is unknown whether radio waves can reach. It is assumed that each terminal has a wireless LAN as the communication unit 112 (see FIG. 4). Although the terminals have not recognized the mutual existence, they intend to search for a near terminal.

The terminals share a rule for outputting a neighborhood wireless search parameter based on a certain input. The output is determined uniquely. In the present example, a wireless channel performing a search and waiting is output as a neighborhood wireless search parameter. In the present technology, the above-described rule is not defined strictly except that the output is determined uniquely. However, it is preferable that no large deviation exists in the relation between an input and an output. In the present example, position information is used for this input.

Figure 5:
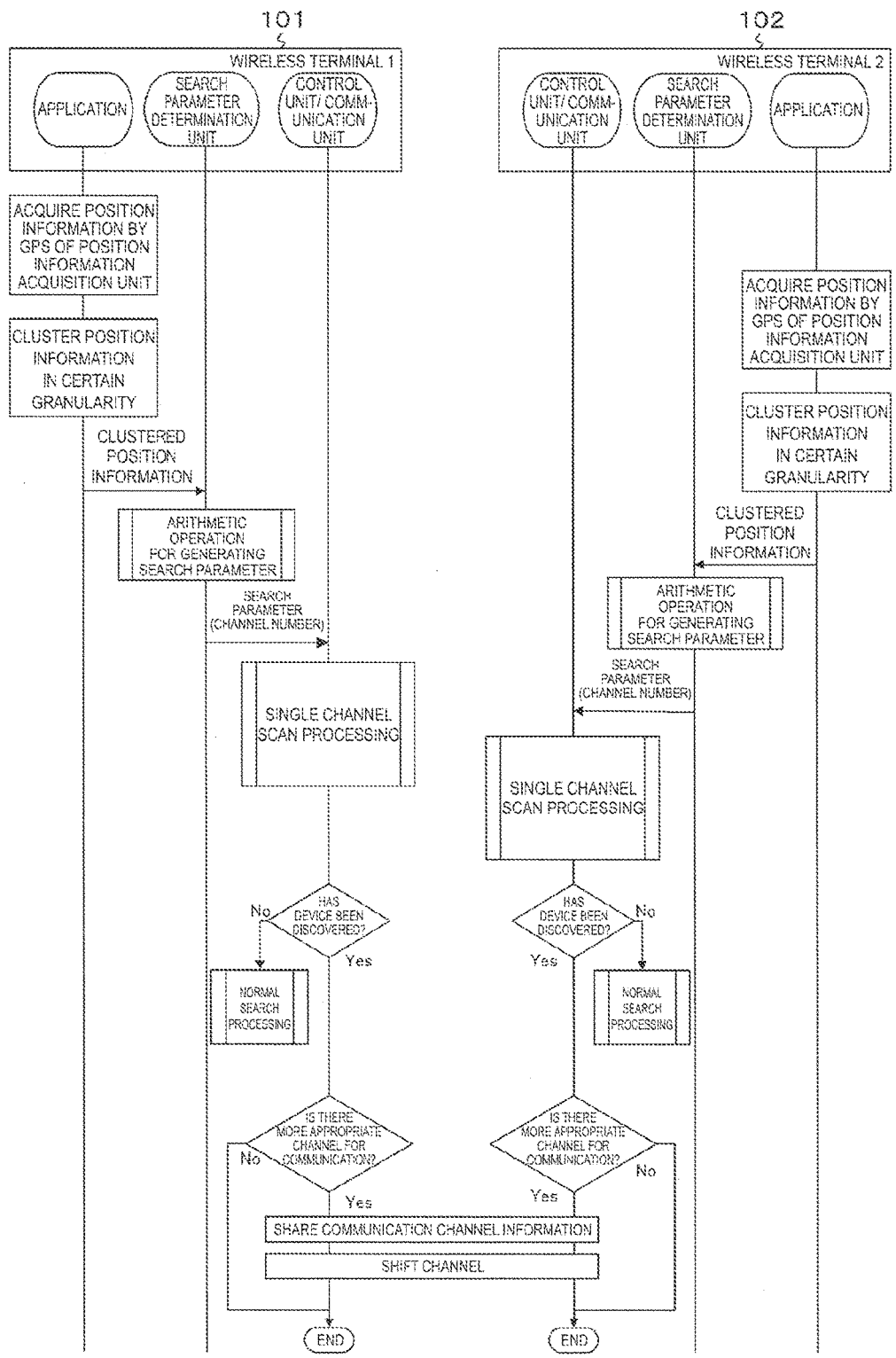
FIG. 5 is a flowchart illustrating processing in each terminal in the searching procedure performed first for the connection of wireless terminals (Example 1).

The flowchart in FIG. 5 illustrates processing in each terminal. Although the terminals are basically asynchronous, they perform the same operation.

First, the position information acquisition unit 116 acquires, using the GPS and the like, a latitude and a longitude as position information of the terminal including the position information acquisition unit 116. Next, the position information acquisition unit 116 clusters the latitude and the longitude in the granularity of several ten meters approximately, and inputs them to the search parameter determination unit 117. In the present example, the arithmetic operation shown in the following Expression (1) and Expression (2), for example, are performed, so that each of the latitude and the longitude in a certain range is represented by one value. The clustering aims at absorbing an error of the GPS and allowing selection of the same channel number for terminals in a certain range.

[Math. 1]

$$X = \lfloor \text{Longitude} * 10000 \rfloor \quad (1)$$

$$Y = \lfloor \text{Latitude} * 10000 \rfloor \quad (2)$$

The operator $\lfloor x \rfloor$ means the largest integer smaller than or equal to x.

Next, the search parameter determination unit 117 converts the longitude X and the latitude Y clustered by the above-described expressions into a channel number N of a wireless channel, and notifies the controller 111 of the channel number N. In the present example, the arithmetic operation shown in the following Expression (3) is performed to obtain the channel number N, for example.

[Math. 2]

$$N = \{(X+Y) \bmod 3\} * 5 + 1 \quad (3)$$

Figure 6:
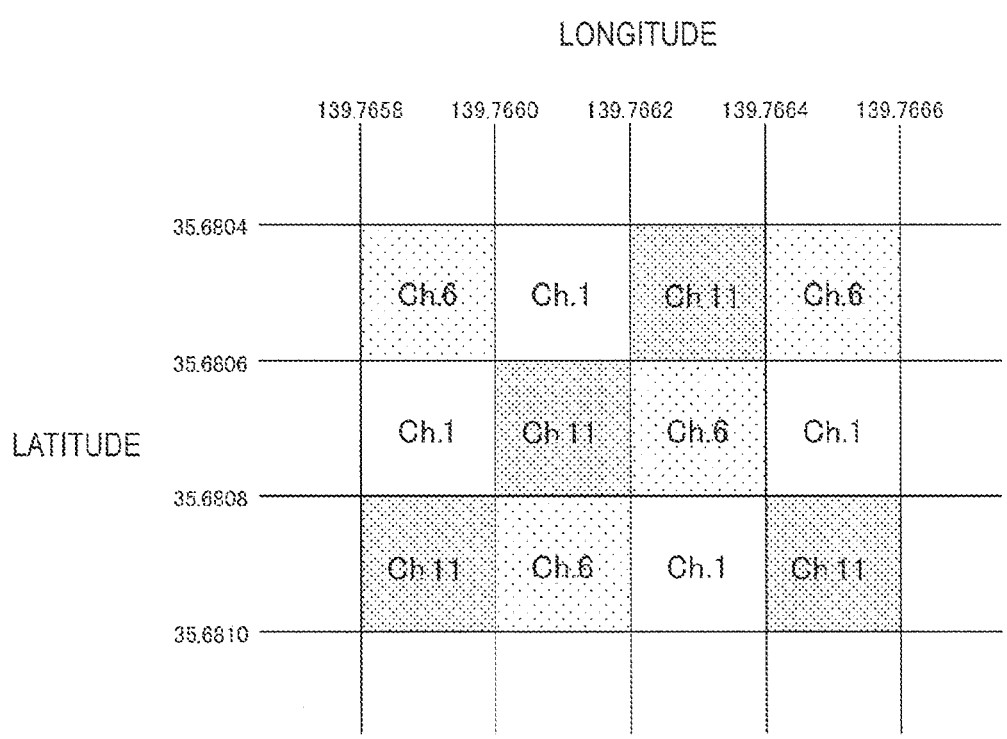
FIG. 6 is a diagram illustrating an output image of channel numbers of a wireless channel calculated as search parameters.

This arithmetic operation is an example of arithmetic operation for uniquely mapping a latitude and a longitude on any of social channels (channels 1, 6, 11) defined by Wi-Fi Direct, and the method of arithmetic operation in the search parameter determination unit 117 is not limited except that the output is determined uniquely. When the number of candidates for search target channels is changed, the arithmetic expression may be also changed. FIG. 6 illustrates an output image of channel numbers calculated using the above-described arithmetic expression.

Note that a propagation distance differs depending on a wireless system used for a search, and thus the granularity of clustering can be changed into a range reached by radio waves, in accordance with a wireless system. Moreover, the relation between an actual distance and a difference of a longitude depends on a latitude. Thus, regarding the clustering of the longitude, the arithmetic operation may be performed weighing the latitude and the longitude for correction. Note that it is assumed that both terminals share not only a channel number calculation expression but also a clustering method.

The controller 111 performs single channel scan processing using a wireless channel (search channel) with the channel number N received from the search parameter determination unit 117. Although the detailed explanation of the single channel scan processing is omitted, the processing is same as the example illustrated in the above-described FIG. 3. When the terminals perform the same operation, it is highly possible, if they are close to each other, that the same wireless channel is output. Thus, the terminals can discover each other instantaneously regardless of start timing.

It is natural that the search channel determined in this way is not necessarily optimal for actual communication. It is because there may exist a plurality of wireless LAN basic service sets (BSS) established already, causing much interference. Therefore, after the discovery, a more appropriate channel with small interference and the movement time are shared by both using the search channel, and the channel is shifted before starting actual communication.

Here, when one terminal already performs communication using a network already established in a channel different from a found channel, the discovery is not possible only by a scan in the found channel. When a partner terminal is not discovered by the above-described method for a certain period of time, fallback to a normal scan in all channels is performed for a search (See FIG. 2).

Note that although the present example describes an example using two terminals, the method can be extended easily for a mutual search and connection among three or more terminals.

Example 2

In the wireless communication system 10 illustrated in FIG. 1, each of the wireless terminals 101, 102 has not recognized the mutual existence, and it is unknown whether radio waves can reach. It is assumed that each terminal has a wireless LAN as the communication unit 112 (see FIG. 4). Although the terminals have not recognized the mutual existence, they intend to search for a near terminal.

The terminals share a rule for outputting a neighborhood wireless search parameter based on a certain input. The output is determined uniquely. In the present example, a wireless channel performing a search and waiting is output as a neighborhood wireless search parameter. In the present technology, the above-described rule is not defined strictly except that the output is determined uniquely. However, it is preferable that no large deviation exists in the relation between an input and an output.

For example, it is assumed that terminals and users having the terminals are in an event site and they intend to search for users who are in the vicinity and have the same interest and preference so as to have communication, although they have not recognized the mutual existence. In the present example, user's preference or situation is used as the input to the search parameter determination unit 117.

Figure 7:
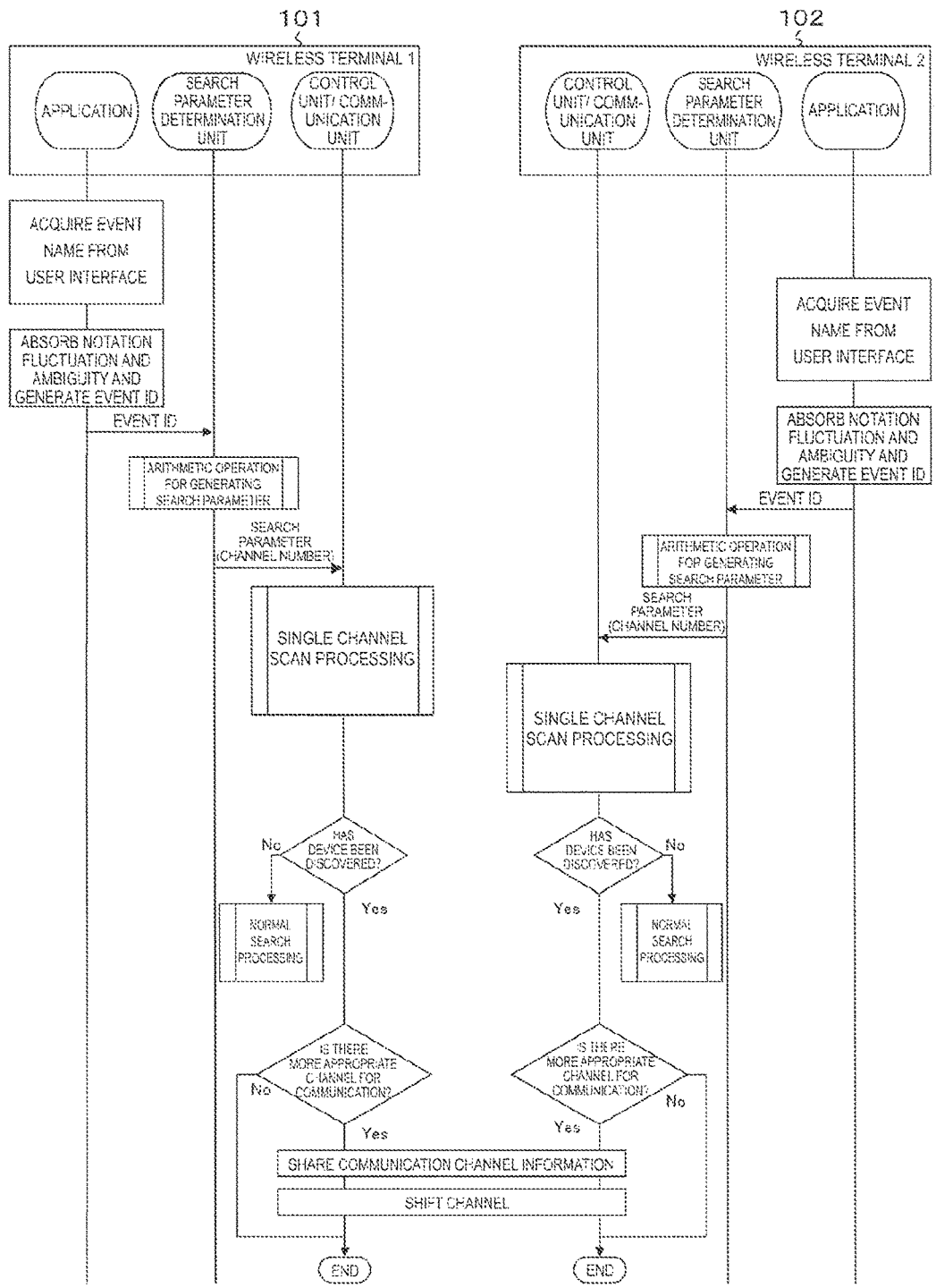
FIG. 7 is a flowchart illustrating processing in each terminal in the searching procedure performed first for the connection of wireless terminals (Example 2).

The flowchart in FIG. 7 illustrates processing in each terminal. Although the terminals are basically asynchronous, they perform the same operation.

First, an application acquires an event name in which the user is participated, which is input by the user from the user interface 115. Then, the application absorbs notation fluctuation of the event name and then generates an identifier of the event (event ID). To be more specific, the application sets an output value obtained by inputting a character string indicating the event name to an ND5 hash function, as an event identifier I, and inputs the event identifier I to the search parameter determination unit 117.

The search parameter determination unit 117 converts the event identifier I into the channel number N of a wireless channel, and notifies the controller 111 of the channel number N. In the present example, the arithmetic operation shown in the following Expression (4) is performed to obtain the channel number N, for example.

[Math. 3]

$$N=\{I \bmod 3\}*5+1 \qquad (4)$$

Although the detailed explanation is omitted, the subsequent processing is same as the above-described Example 1. In the present example, the identifier (event ID) is generated based on the event name in which the user is participated, and used. However, the identifier may be generated based on not only the event but also a net radio broadcasting station in broadcasting, or more directly a name of an interest or a preference, and used. When the terminals share a hash function and a generation arithmetic rule of the search parameter determination unit 117, it is possible, by performing such processing, to discover rapidly only a wireless terminal of a user having the same situation and preference.

Example 3

In the wireless communication system 10 illustrated in FIG. 1, each of the wireless terminals 101, 102 has not recognized the mutual existence, and it is unknown whether radio waves can reach. It is assumed that each terminal has a wireless LAN as the communication unit 112 (see FIG. 4). Although the terminals have not recognized the mutual existence, they intend to search for a near terminal.

The terminals share a rule for outputting a neighborhood wireless search parameter based on a certain input. The output is determined uniquely. In the present example, a wireless channel performing a search and waiting is output as a neighborhood wireless search parameter. In the present technology, the above-described rule is not defined strictly except that the output is determined uniquely. However, it is preferable that no large deviation exists in the relation between an input and an output.

In the present example, it is assumed that the terminals have a past history of connection in an application level to perform a group chat. Then, it is supposed that each terminal has a group ID for the group chat in the storage unit 118. It is assumed that the terminals desire to perform communication among them using the same group chat application while they have not recognized the mutual existence and it is unknown whether radio waves can reach. In the present example, the group ID is used as the input to the search parameter determination unit 117.

Figure 8:
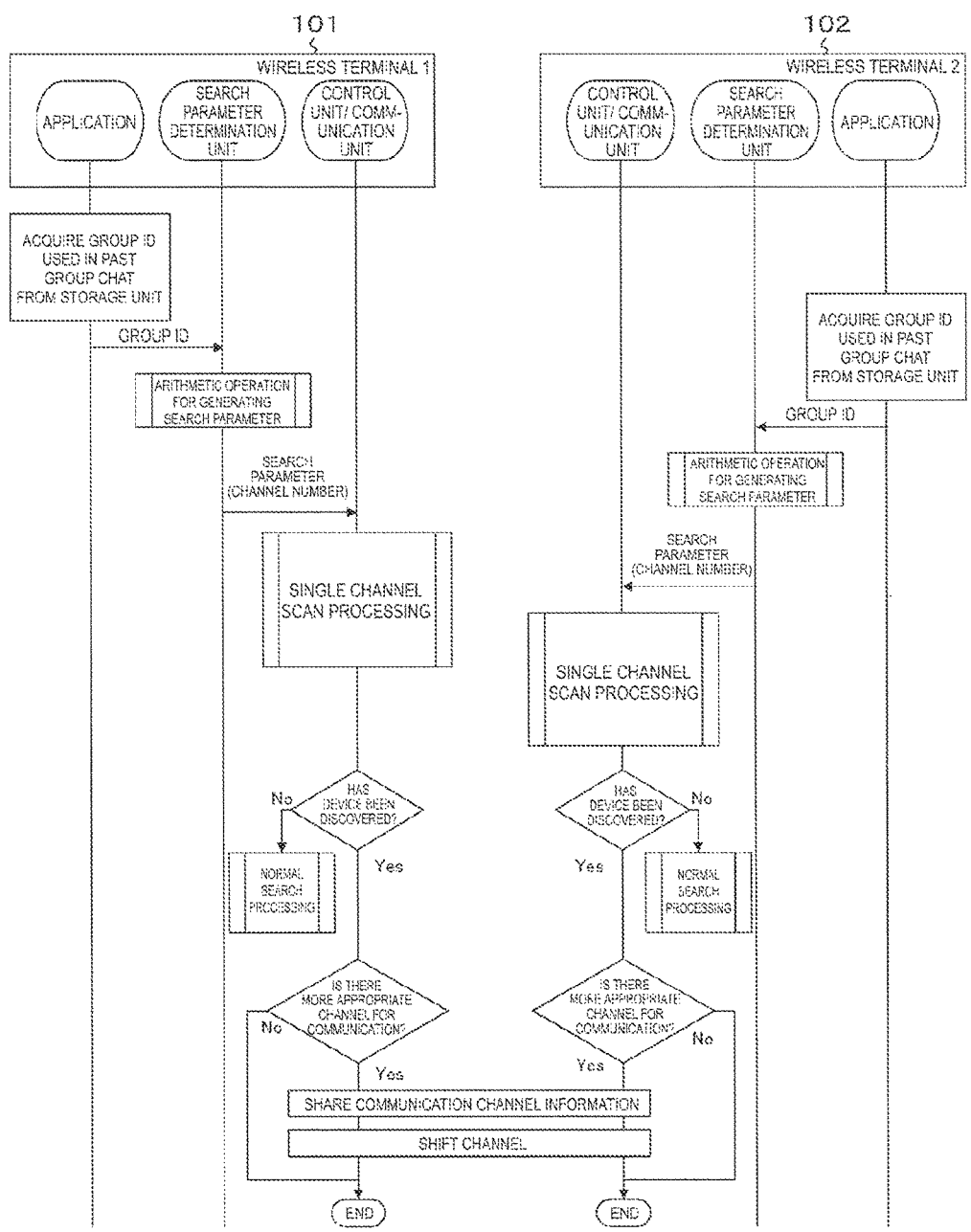
FIG. 8 is a flowchart illustrating processing in each terminal in the searching procedure performed first for the connection of wireless terminals (Example 3).

The flowchart in FIG. 8 illustrates processing in each terminal. Although the terminals are basically asynchronous, they perform the same operation.

First, the application acquires the group ID used in the past group chat from the storage unit 118, and inputs the group ID to the search parameter determination unit 117. The search parameter determination unit 117 converts the group ID into the channel number N of the wireless channel using the same arithmetic expression as the above-described Expression (4), and notifies the controller 111 of the channel number N.

Although the detailed explanation is omitted, the subsequent processing is same as the above-described Example 1 and Example 2. When the terminals share a generation arithmetic rule of the search parameter determination unit 117, it is possible, by performing such processing, to discover rapidly a terminal having the common information. In this case, as long as the information is shared by the terminals, the information may not be necessarily of an application level. For example, when the group communication is performed using an IP multicast, the information of the application layer or lower such as the IP multicast address can be used as an input.

Example 4

Figure 9:
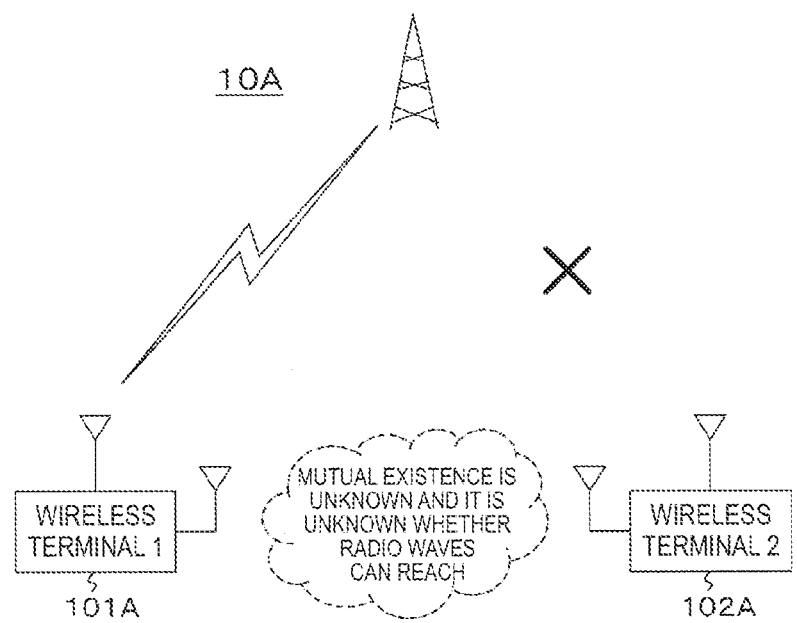
FIG. 9 is a block diagram illustrating a configuration example of a wireless communication system.

FIG. 9 illustrates a configuration example of a wireless communication system 10A in the present example. The wireless communication system 10A includes a plurality of wireless terminals, two wireless terminals 101A, 102A here. Although the detailed explanation is omitted, each terminal is configured in the same manner as each terminal of the wireless communication system 10 illustrated in the above-described FIG. 1 (see FIG. 4). However, the wireless terminals 101A, 102A have the communication unit 112 (communication unit 1) of a wireless LAN used for narrow-range communication, and the communication unit 112 (communication unit 2) of a mobile network (LTE) used for wide-range communication.

The wireless terminals 101A, 102A have not recognized the mutual existence, and it is unknown whether radio waves can reach. It is assumed here that the wireless terminal 102A is not connected to (is outside the range of) a mobile network. In this situation, it is assumed that the wireless terminal 101A intends to make a call to the wireless terminal 102A.

Figure 10:
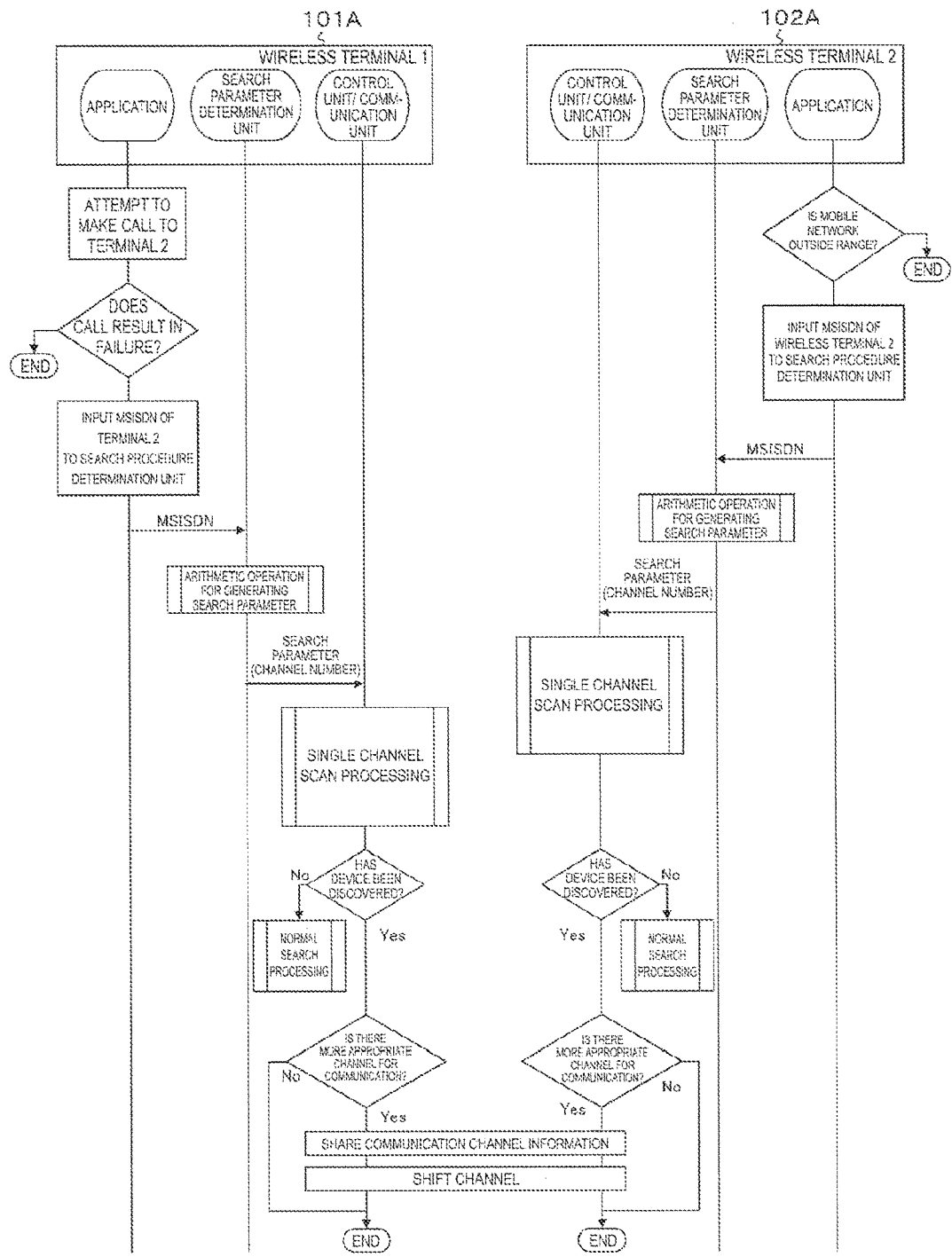
FIG. 10 is a flowchart illustrating processing in each terminal in the searching procedure performed first for the connection of wireless terminals (Example 4).

The flowchart in FIG. 10 illustrates processing in each terminal. In the present example, the operation of the wireless terminal 101A and the wireless terminal 102A is not symmetrical, unlike the above-described Examples 1 to 3.

The application of the wireless terminal 101A attempts to make a call to the wireless terminal 102A, and intends, when the call results in failure, narrow-range communication, that is, direct connection using a wireless LAN. In this case, the wireless terminal 101A has a mobile subscriber integrated services digital network number (MSISDN: telephone number identifying a subscriber) of the wireless terminal 102A, which is used for the call.

The application of the wireless terminal 101A inputs the MSISDN to the search parameter determination unit 117. The search parameter determination unit 117 converts the MSISDN into a channel number N of a wireless channel using the same arithmetic expression as the above-described Expression (4), and notifies the controller 111 of the channel number N. The subsequent processing of the wireless terminal 101A is same as that of the wireless terminal 101 of the above-described Examples 1 to 3.

Meanwhile, the wireless terminal 102A is in the state only waiting for an incoming call. Thus, once the wireless terminal 102A detects that it is outside the range of a mobile network, it then inputs its MSISDN to the search parameter determination unit 117. The search parameter determination unit 117 converts the MSISDN into a channel number N of a wireless channel using the same arithmetic expression as the above-described Expression (4), and notifies the controller 111 of the channel number N. The subsequent processing of the wireless terminal 102A is same as that of the wireless terminal 102 of the above-described Examples 1 to 3.

When the terminals share a generation arithmetic rule of the search parameter determination unit 117, it is possible, by performing such processing, to discover rapidly a terminal even using information unique to one of the terminals or the user, depending on a situation. In the case of the present example, a call by voice over internet protocol (VoIP) is possible after the discovery by a search in narrow-range communication.

In this case, as long as the information is unique to the wireless terminal 102A and known by the wireless terminal 101A, it may not be necessarily a telephone number. For example, the information may be a MAC address of the communication unit 112 (communication unit 2) of the mobile network (LTE), an international mobile equipment identity (IMEI, device identification number) of the communication unit 112 (communication unit 1) of the wireless LAN, an international mobile subscriber identity (IMSI, user identification number) of the communication unit 112 (communication unit 1) of the wireless LAN, the combination of a VoIP application name and an account name, and the like.

Example 5

In the wireless communication system 10 illustrated in FIG. 1, each of the wireless terminals 101, 102 has not recognized the mutual existence, and it is unknown whether radio waves can reach. In the above-described Examples 1 to 4, only a wireless channel number is output as a neighborhood search parameter calculated by the shared rule. However, with an output of a more detailed parameter, it is possible to make a search easier and allow extension for the case with a plurality of communication units (wireless communication systems).

In the present example, it is assumed that each terminal includes the communication unit 112 (communication unit 1) of a wireless LAN, the communication unit 112 (communication unit 2) of Bluetooth, and the communication unit 112 (communication unit 3) of Zigbee. It is assumed that the conditions of the other units are the same as Example 2, and an event identifier (event ID) is used as the input for calculation of a neighborhood wireless search parameter. Although the terminals have not recognized the mutual existence, they intend to search for a near terminal. Note that each of "Bluetooth" and "Zigbee" is a registered trademark.

Figure 11:
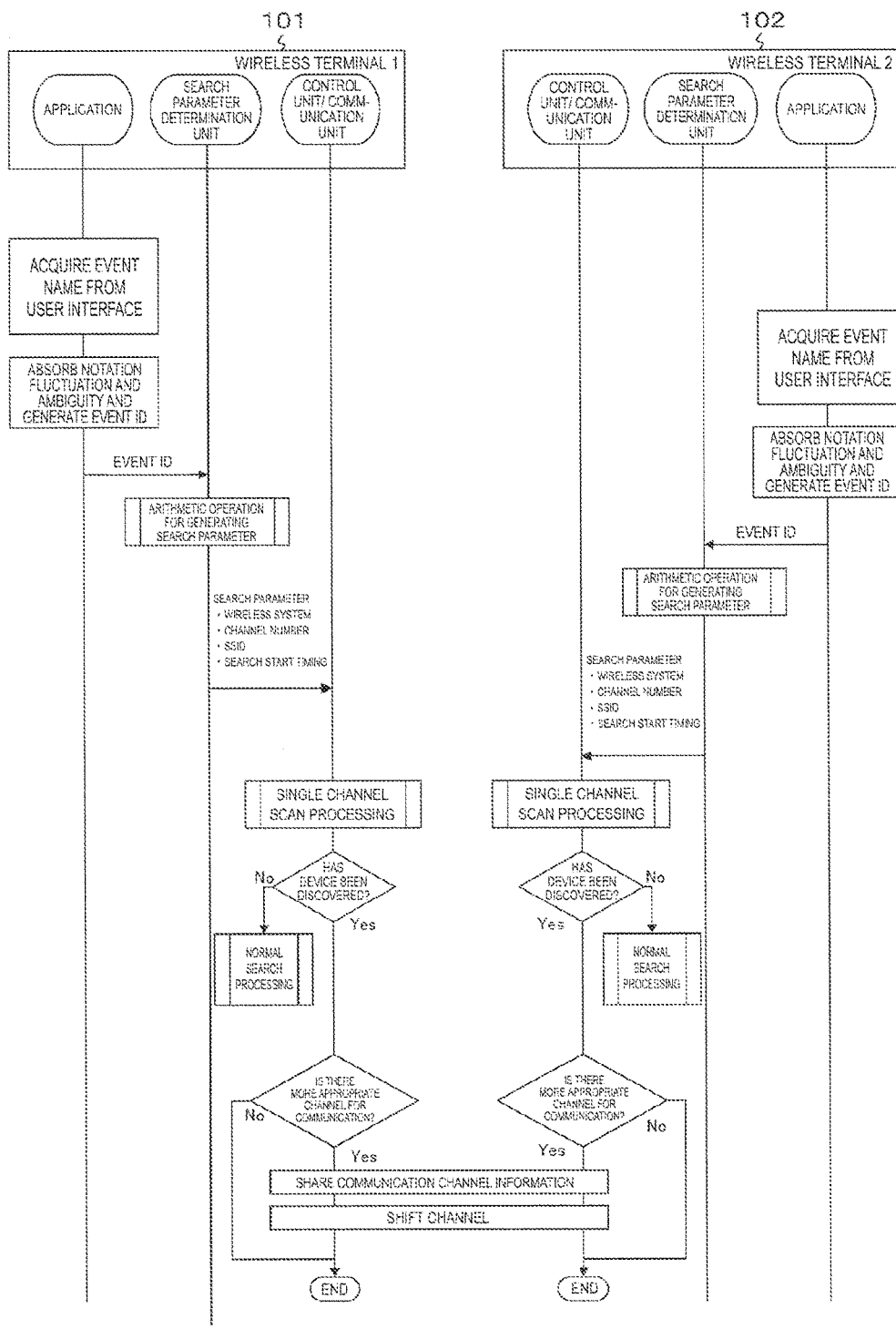
FIG. 11 is a flowchart illustrating processing in each terminal in the searching procedure performed first for the connection of wireless terminals (Example 5).

The flowchart in FIG. 11 illustrates processing in each terminal. Although the terminals are basically asynchronous, they perform the same operation.

First, an application acquires an event name in which the user is participated, which is input by the user from the user interface 115. Then, the application absorbs notation fluctuation of the event name and then generates an identifier of the event (event ID). To be more specific, the application sets an output value obtained by inputting a character string indicating the event name to an ND5 hash function, as an event identifier I, and inputs the event identifier I to the search parameter determination unit 117.

The search parameter determination unit 117 converts the event identifier I into a wireless system (communication system), and notifies the controller 111 of the wireless system. When the number of candidates for possible short distance wireless system is three, for example, the arithmetic operation shown in the following Expression (5) is performed to obtain the corresponding wireless system. In the present example, it is assumed that C=0 is found and the 802.11 wireless LAN is selected, and the processing shifts to the following.

[Math. 4]

$$C = I \bmod 3 = \begin{cases} 0 & \dots & 802.11 \\ 1 & \dots & \text{Bluetooth} \\ 2 & \dots & \text{Zigbee} \end{cases} \quad (5)$$

Moreover, the search parameter determination unit 117 converts the event identifier I into a channel number N of a wireless channel, and notifies the controller 111 of the channel number N. In the present example, the arithmetic operation shown in the following Expression (6) is performed to obtain the channel number N, for example.

[Math. 5]

$$N = \{I \bmod 3\} * 5 + 1 \quad (6)$$

Moreover, the search parameter determination unit 117 converts the event identifier I into a network identifier (SSID), and notifies the controller 111 of the SSID. In this case, the event identifier I is regarded as a character string following "DIRECT-" that is a prefix in accordance with the Wi-Fi Direct standard, so that the character string ""DIRECT-"+I" is set as the SSID, for example.

In addition, the search parameter determination unit 117 obtains search execution timing from the event identifier I and notifies the controller 111 of the search execution timing. In the present example, the arithmetic operation shown in the following Expression (7) is performed to obtain time $t_{search}$ (n) as a candidate group for search execution timing, for example.

[Math. 6]

$$t_{search}(n) = 5 * n + I \bmod 5 \quad (7)$$

The Expression (7) is an arithmetic expression supposing that the slots of start timing are arranged with intervals of one second and five slot candidates are repeated, and the unit of $t_{search}$ (n) is the second. When the value of the second of current time of a terminal is $t_{current}$, $t_{search}$ (n) later in time than $t_{current}$ and closest to $t_{current}$ is adopted as search execution timing among $t_{search}$ (n).

In the above manner, the calculation rules of not only a channel number but also an SSID and search execution timing are shared, whereby even when a search with a different event identifier (event ID) is casually performed in the same channel in the neighborhood, it is possible to distinguish the search by timing or an SSID and make a mutual search efficient.

Note that the above-described arithmetic operation for deriving a wireless system, a wireless channel, an SSID, and search execution timing is one example, and the present technology does not limit a concrete arithmetic operation method except that the output is determined uniquely. When the number of candidates for search target communication systems, search target channels, and search execution timing is changed, the arithmetic expression may be changed.

Although the detailed explanation is omitted, the subsequent processing is same as the above-described Example 2.

Example 6

Figure 12:
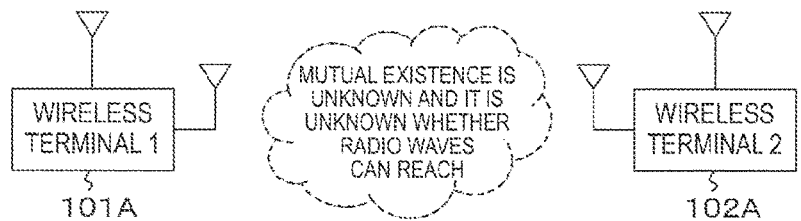
FIG. 12 is a block diagram illustrating a configuration example of a wireless communication system.

FIG. 12 illustrates a configuration example of the wireless communication system 10A in the present example. The wireless communication system 10A includes a plurality of wireless terminals, two wireless terminals 101A, 102A here. Although the detailed explanation is omitted, each terminal is configured in the same manner as each terminal of the wireless communication system 10 illustrated in the above-described FIG. 1 (see FIG. 4). However, the wireless terminals 101A, 102A includes the communication unit 112 (communication unit 1) of a wireless LAN for narrow-range communication, and the communication unit 112 (communication unit 2) of a mobile network (GSM/W-CDMA/LTE, etc.) used for wide-range communication. Note that "GSM" is a registered trademark.

When a communication path to a search target object is established by another communication unit such as in wide-range wireless, prior to the neighborhood search, it is possible to directly notify of a search parameter using the communication path so as to perform a single channel scan. In the present example, the processing for preparing a search is branched depending on the presence or absence of a link by another communication unit.

Figure 13:
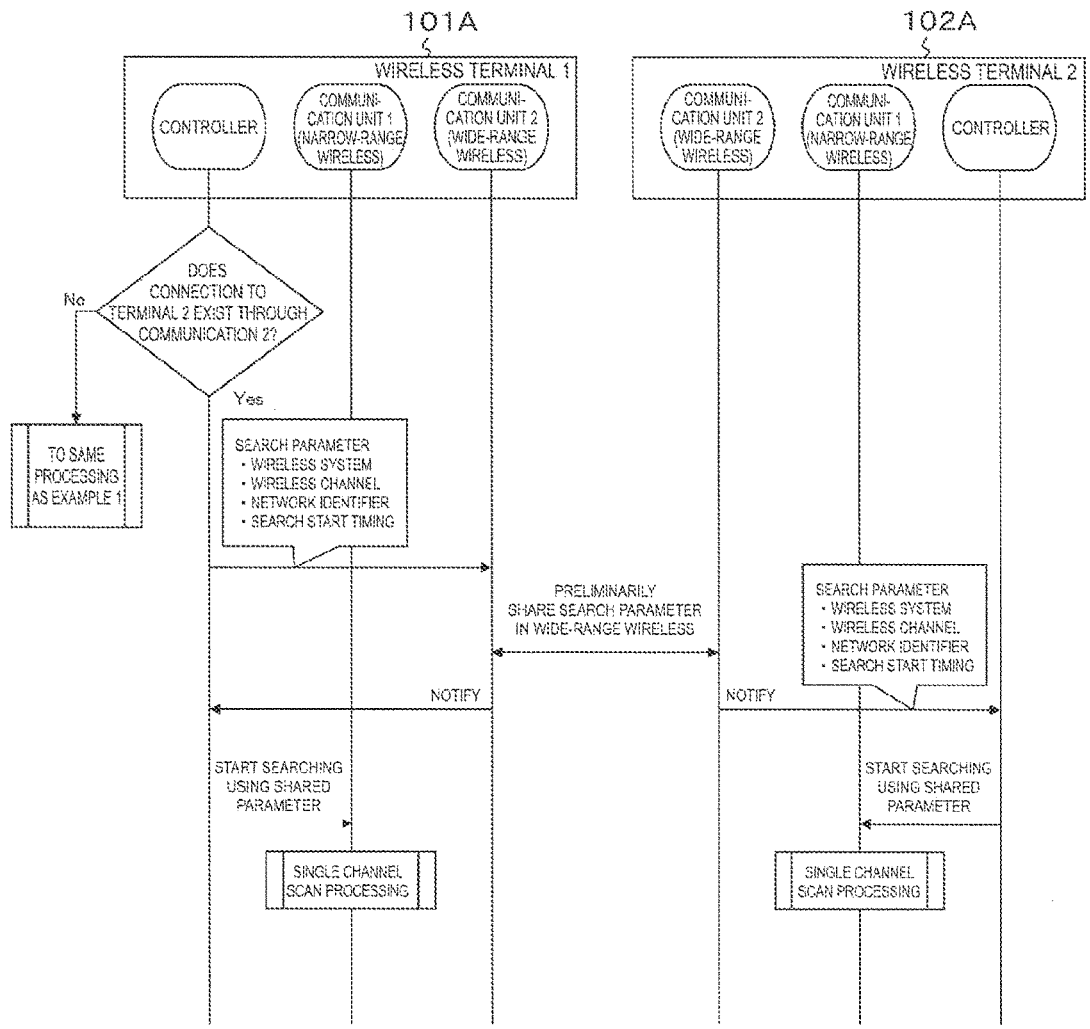
FIG. 13 is a flowchart illustrating processing in each terminal in the searching procedure performed first for the connection of wireless terminals (Example 6).

The flowchart in FIG. 13 illustrates processing in each terminal. In the present example, the operation of the wireless terminal 101A and the wireless terminal 102A is not symmetrical.

It is assumed that the wireless terminal 101A intends to perform a search using the communication unit 112 (communication unit 1) of a wireless LAN so as to confirm whether the connection with the wireless terminal 102A using an 802.11 wireless LAN is possible.

First, the controller 111 of the wireless terminal 101A confirms whether the connection to the wireless terminal 102A exists through the communication unit 112 (communication unit 2) of a mobile network (GSM/W-CDMA/LTE, etc.) that is wide-range wireless. When the connection exists and the exchange of information with the wireless terminal 102A is possible, the wireless terminal 101A transmits a search parameter used for a search using the communication unit 112 (communication unit 1) to the wireless terminal 102A through the communication unit 112 (communication unit 2). The transmitted search parameter includes a wireless system (802.11 wireless LAN here), a wireless channel, a network identifier, and search execution timing.

Once the reception of the information is confirmed by the wireless terminal 102A, it is considered that their neighborhood wireless search parameter is shared. Each terminal starts a search by a single channel scan, with reference to the parameter. Here, when a communication path to the wireless terminal 102A through the communication unit 112 (communication unit 2) is not established, each terminal performs the same procedure as the above-described Example 1 for a search. When the processing is branched in this manner, the devices can be discovered each other more rapidly under various conditions.

As described above, in the above-described embodiments, a search target wireless terminal is discovered by search processing based on a search parameter for searching for a search target wireless terminal that is determined by preliminarily set correspondence relation (generation arithmetic operation rule) from given information. Thus, it is possible to rapidly discover a wireless terminal as a connection partner without preliminarily sharing information related to a scan. This allows a user to perform connection without any stress, and reduces power consumption for a search.

2. Modification

Note that in the present technology, a search parameter for searching for a search target wireless terminal is determined based on preliminarily set correspondence relation from given information and search processing is performed based on the search parameter, as described above. For example, the search parameter may include at least one of a wireless system, a wireless channel, a network identifier, and search execution timing.

The given information is position information, information unique to a search target wireless terminal, and the like, as described above. The information unique to a search target wireless terminal may include at least one of a terminal identification ID, and a common ID depending on an application. Then, in this case, the terminal identification ID may include at least one of a MAC address or an IMEI of a terminal and an IMSI or an MSISDN of a terminal contract.

In this case, the common ID depending on an application may include at least one of an application name, information specifying a past session between terminals, information specifying a belonging group, information specifying a community, information specifying an event being held, information specifying an area in which a terminal exists, and information specifying a user's preference. Moreover, in this case, the common ID depending on an application may be a multicast IP address.

The embodiments of the present technology have been described with reference to the accompanying drawings, whilst the present technology is not limited to the above examples. It is clear that a person skilled in the art may find various alterations and modifications within the technical ideas described in the appended claims, and it should be understood that they will naturally come under the technical scope of the present technology. For example, although the explanation has been given assuming that the wireless terminal is a cellular phone, the wireless terminal is not limited to a cellular phone and may be a mobile information processing device such as a PDA, a game machine, and a small PC.

Additionally, the present technology may also be configured as below.

(1)
A wireless terminal including:
a search parameter determination unit configured to determine a search parameter for searching for a search target wireless terminal based on preliminarily set correspondence relation from given information; and
a search processing unit configured to perform search processing based on the determined search parameter and to discover the search target wireless terminal.

(2)
The wireless terminal according to (1),
wherein the given information is position information of the wireless terminal.

(3)
The wireless terminal according to (2),
wherein the search parameter determination unit clusters and uses the position information in given granularity.

(4)
The wireless terminal according to (3),
wherein the search parameter determination unit uses, as the given granularity, granularity in accordance with a wireless system used for a search.

(5)
The wireless terminal according to (1),
wherein the given information is information unique to a search target wireless terminal.

(6)
The wireless terminal according to (5),
wherein the information unique to a search target wireless terminal includes at least one of a terminal identification ID, and a common ID depending on an application.

(7)
The wireless terminal according to (6),
wherein the terminal identification ID includes at least one of a MAC address or an IMEI of a terminal and an IMSI or an MSISDN of a terminal contract.

(8)
The wireless terminal according to (6),
wherein the common ID depending on an application includes at least one of an application name, information specifying a past session between terminals, information specifying a belonging group, information specifying a community, information specifying an event being held, information specifying an area in which a terminal exists, and information specifying a user's preference.

(9)
The wireless terminal according to (6),
wherein the common ID depending on an application is a multicast IP address.

(10)
The wireless terminal according to any of (1) to (9),
wherein the search parameter includes at least one of a wireless system, a wireless channel, a network identifier, and search execution timing.

(11)
The wireless terminal according to any of (1) to (10),
wherein, when connection in another wireless system does not exist between the wireless terminal and the search target wireless terminal, the search parameter determination unit determines the search parameter based on the given information, and
wherein the search processing unit performs search processing based on the determined search parameter and discovers the search target wireless terminal.

(12)
The wireless terminal according to any of (1) to (11),
wherein the search parameter determination unit determines a wireless channel as the search parameter, and
wherein the search processing unit performs search processing by fallback to a scan in all channels when the search target wireless terminal is not discovered by search processing based on the determined wireless channel.

(13)
The wireless terminal according to any of (1) to (12),
wherein the search parameter determination unit determines a wireless channel as the search parameter,
wherein the search processing unit discovers the search target wireless terminal by search processing based on the determined wireless channel, and
wherein the wireless terminal further includes a wireless channel change unit configured to change, after the wireless terminal is connected to the discovered search target wireless terminal in the wireless channel serving as the search parameter, the wireless channel to a more appropriate wireless channel (14)

A search process method for a wireless terminal, the search process method including:

determining, by a search parameter determination unit, a search parameter for searching for a search target wireless terminal based on preliminarily set correspondence relation from given information; and performing search processing based on the determined search parameter and discovering the search target wireless terminal.

(15)

A wireless communication system including:

a plurality of wireless terminals, wherein each of the plurality of wireless terminals includes a search parameter determination unit configured to determine a search parameter for searching for a search target wireless terminal based on preliminarily set correspondence relation from given information, and a search processing unit configured to perform search processing based on the determined search parameter and to discover the search target wireless terminal, and wherein the search parameter determination unit of the plurality of wireless terminals determines the search parameter based on the same correspondence relation from the given information.

REFERENCES SIGNS LIST 10, 10A wireless communication system
100, 101, 101A, 102, 102A wireless terminal
111 controller
112 communication unit
113 antenna
114 data input/output unit
115 user interface
116 position information acquisition unit
117 search parameter determination unit
118 storage unit

The invention claimed is:

1. A first wireless terminal for searching for a wireless terminal, comprising:
  circuitry configured to:
    acquire first information of the first wireless terminal, wherein the first information comprises first position information of the first wireless terminal;
    generate second position information of the first wireless terminal, based on an error amount calculation operation on the first position information, in a granularity of a range,
    wherein the error amount calculation operation deletes an error from the first position information in order to determine a plurality of wireless channels used by the first wireless terminal;
    determine a wireless channel in the plurality of wireless channels, as a search parameter, based on implementation of at least one rule on the second position information, to search for presence of a second wireless terminal in the granularity of the range; and
    search, based on a scan of the wireless channel in the plurality of wireless channels, for the presence of the second wireless terminal for communication.

2. The first wireless terminal according to claim 1, wherein the circuitry is further configured to change the granularity of the range, based on a wireless system for the search.

3. The first wireless terminal according to claim 1, wherein the first information is unique to the second wireless terminal.

4. The first wireless terminal according to claim 3, wherein the first information unique to the second wireless terminal further includes an application based terminal ID of the second wireless terminal.

5. The first wireless terminal according to claim 4, wherein the application based terminal ID includes at least one of a Media Access Control (MAC) address or an International Mobile Equipment Identity (IMEI) of the second wireless terminal and an International Mobile Subscriber Identity (IMSI) or a Mobile Station International Subscriber Directory Number (MSISDN) of a terminal contract.

6. The first wireless terminal according to claim 1,
wherein the first information further comprises common identification (ID) information,
wherein the common ID information is based on an application of the first wireless terminal, and
wherein the common ID information includes at least one of an application name of an application, second information associated with an event of the first wireless terminal, third information specifying a group, fourth information specifying a community, fifth information specifying a session history between the first wireless terminal and the second wireless terminal, or sixth information specifying an area of a network in which the second wireless terminal exists.

7. The first wireless terminal according to claim 6, wherein the common ID information is a multicast IP address.

8. The first wireless terminal according to claim 1, wherein the search parameter further includes at least one of a wireless system or a network identifier.

9. The first wireless terminal according to claim 1, wherein the circuitry is further configured to:
  determine a first wireless channel having a first quality value, as the search parameter;
  discover the second wireless terminal, based on the first wireless channel;
  connect the first wireless terminal to the second wireless terminal in the first wireless channel; and
  change the first wireless channel to a second wireless channel having a second quality value,
  wherein the second quality value is greater than the first quality value.

10. A method for searching for a wireless terminal, comprising:
  in a first wireless terminal:
    acquiring first information of the first wireless terminal, wherein the first information comprises first position information of the first wireless terminal;
    generating second position information of the first wireless terminal, based on an error amount calculation operation on the first position information, in a granularity of a range,
    wherein the error amount calculation operation deletes an error from the first position information in order to determine a plurality of wireless channels used by the first wireless terminal;
    determining a wireless channel in the plurality of wireless channels, as a search parameter, based on implementation of at least one rule on the second position information, to search for presence of a second wireless terminal in the granularity of the range; and searching, based on a scan of the wireless channel in the plurality of wireless channels, for the presence of the second wireless terminal for communication.

11. A wireless communication system for searching for a wireless terminal, comprising:

a plurality of wireless terminals including at least a first wireless terminal and a second wireless terminal, wherein the first wireless terminal of the plurality of wireless terminals includes circuitry configured to:

acquire first information of the first wireless terminal of the plurality of wireless terminals, wherein the first information comprises first position information of the first wireless terminal;

generate second position information of the first wireless terminal, based on an error amount calculation operation on the first position information, in a granularity of a range, wherein the error amount calculation operation deletes an error from the first position information in order to determine a plurality of wireless channels used by the first wireless terminal;

determine a wireless channel in the plurality of wireless channels, as a search parameter, based on implementation of at least one rule on the second position information, to search for presence of the second wireless terminal of the plurality of wireless terminals in the granularity of range; and search, based on a scan of the wireless channel in the plurality of wireless channels, for the presence of the second wireless terminal for communication.

* * * * *